United States Patent
Zhu

(10) Patent No.: US 11,302,228 B2
(45) Date of Patent: Apr. 12, 2022

(54) FOLDABLE DISPLAY DEVICE AND CONTROL METHOD THEREOF

(71) Applicant: BOE Technology Group Co., Ltd., Beijing (CN)

(72) Inventor: Wenxiu Zhu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 8 days.

(21) Appl. No.: 16/772,241

(22) PCT Filed: Dec. 20, 2019

(86) PCT No.: PCT/CN2019/127228
§ 371 (c)(1),
(2) Date: Jun. 12, 2020

(87) PCT Pub. No.: WO2020/140777
PCT Pub. Date: Jul. 9, 2020

(65) Prior Publication Data
US 2021/0201720 A1    Jul. 1, 2021

(30) Foreign Application Priority Data
Jan. 3, 2019  (CN) .......................... 201910004739.2

(51) Int. Cl.
*G09G 3/00* (2006.01)
*G09G 5/14* (2006.01)
*G01B 11/26* (2006.01)

(52) U.S. Cl.
CPC .............. *G09G 3/035* (2020.08); *G01B 11/26* (2013.01); *G09G 5/14* (2013.01); *G09G 2330/022* (2013.01); *G09G 2360/14* (2013.01)

(58) Field of Classification Search
CPC ...... G09G 3/035; G06F 1/1641; G06F 1/1616
See application file for complete search history.

(56) References Cited

U.S. PATENT DOCUMENTS

2013/0328764 A1  12/2013  Chon et al.
2014/0043226 A1*  2/2014  Lee .................. G06F 1/1652
                                                                      345/156
(Continued)

FOREIGN PATENT DOCUMENTS

CN    103257469 A    8/2013
CN    103489372 A    1/2014
(Continued)

OTHER PUBLICATIONS

Chinese Office Action corresponding to 201910004739.2 dated Jan. 3, 2020.
(Continued)

*Primary Examiner* — Kevin M Nguyen
(74) *Attorney, Agent, or Firm* — Arent Fox LLP; Michael Fainberg

(57) ABSTRACT

A foldable display device includes a display screen including a first half screen and a second half screen, a controller and at least one angle probe set. Each set includes a transmitter and a plurality of receivers. The transmitter is inclined at a first angle with respect to the first half screen and faces the second half screen, and is configured to emit collimated infrared light. Each receiver is inclined at a second angle with respect to the second half screen, and is in signal connection with the controller, and is configured to transmit an electrical signal to the controller when receiving the collimated infrared light. The controller is in signal connection with the display screen, and is configured to determine a bending angle from angle information of the receiver and control the display screen to switch to a display state for the bending angle.

12 Claims, 3 Drawing Sheets

(56) References Cited

U.S. PATENT DOCUMENTS

| | | | |
|---|---|---|---|
| 2014/0345383 A1 | 11/2014 | Li et al. | |
| 2016/0034047 A1* | 2/2016 | Lee | G06F 3/03 |
| | | | 345/156 |
| 2016/0252988 A1 | 9/2016 | Feng et al. | |
| 2016/0329011 A1 | 11/2016 | Wang | |
| 2017/0076561 A1 | 3/2017 | Zhao et al. | |
| 2018/0082632 A1 | 3/2018 | Lee | |
| 2018/0322848 A1 | 11/2018 | Wu et al. | |

FOREIGN PATENT DOCUMENTS

| | | |
|---|---|---|
| CN | 104238833 A | 12/2014 |
| CN | 104503546 A | 4/2015 |
| CN | 105068732 A | 11/2015 |
| CN | 206039477 U | 3/2017 |
| CN | 207081834 U | 3/2018 |
| CN | 107911508 A | 4/2018 |
| CN | 108566458 A | 9/2018 |
| CN | 108806507 A | 11/2018 |
| CN | 109671356 A | 4/2019 |
| JP | 2005010291 A | 1/2005 |
| JP | 2008277895 A | 11/2008 |
| JP | 2010266777 A | 11/2010 |

OTHER PUBLICATIONS

Chinese Office Action corresponding to 201910004739.2 dated Apr. 23, 2020.

Decision of Rejection corresponding to 201910004739.2 dated Sep. 27, 2020.

\* cited by examiner

FOLDABLE DISPLAY DEVICE AND CONTROL METHOD THEREOF

CROSS REFERENCE TO RELATED APPLICATION

This application is a US National Stage of International Application No. PCT/CN2019/127228, filed on Dec. 20, 2019, which claims the priority of Chinese Patent Application No. 201910004739.2, filed with the Chinese Patent Office on Jan. 3, 2019, and entitled "Foldable Display Device and Control Method thereof", which is hereby incorporated by reference in its entirety.

FIELD

The present application relates to the field of display technology, and in particular, to a foldable display device and a control method thereof.

BACKGROUND

With the development of science and the advancement of technology, people's requirements and dependence on electronic devices (such as mobile phones and tablets) are increasing day by day. Portable mobile phone develops toward computer, but is unable to realize core functions of computers due to small screens. While a tablet computer with a moderate-size screen takes up a lot of space and is inconvenient to carry due to its straight panel shape of about 10 inches. Therefore, a large-size foldable display device, having a moderate-size screen and being easy to carry, was born.

At present, a large-size foldable display device has two folding states, i.e. an inwardly curved state and an outwardly curved state. It occupies less space and is easy to carry when being curved inwardly, and is used as a mobile phone when being curved outwardly. Different viewing experiences may be achieved at different bending degrees. Currently, bending angle detection is usually implemented by using an angle transducer, which is provided in a bending shaft of the display device. When the display device is bent at different degrees, the angle transducer obtains the bending angles by counting. However, most existing angle transducers are large, which is not conducive to lightening and thinning of display devices and cannot be integrated with other functions of the devices.

Therefore, it is particularly important to design a foldable display device capable of detecting bending angles.

SUMMARY

The present application provides a foldable display device and a control method thereof. The foldable display device is provided with a plurality of receivers capable of detecting bending angles to realize display state changes at different bending angles, thus improving the user experience.

To achieve the above object, the present application provides the following technical solutions.

A foldable display device includes: a display screen including a first half screen and a second half screen, a controller and at least one angle probe set. Each angle probe set comprises a transmitter and a plurality of receivers, and the transmitter and the plurality of receivers are located on a same surface of the display screen. The transmitter is inclined at a first angle with respect to the first half screen and faces the second half screen, and is configured to emit collimated infrared light. Each of the plurality of receivers is inclined at a second angle with respect to the second half screen, where different receivers have different second angles. Each of the plurality of receivers is in signal connection with the controller, and is configured to transmit an electrical signal to the controller when receiving the collimated infrared light. The controller is in signal connection with the display screen, and is configured to determine a bending angle according to angle information of the receiver corresponding to the received electrical signal and control the display screen to switch to a display state for the bending angle.

Optionally, the plurality of receivers are distributed in an array of two rows, where second angles of two receivers in each column are supplementary.

Optionally, the difference between second angles of two adjacent receivers in each row is not more than 30°.

Optionally, the second angle is greater than the first angle.

Optionally, each of the plurality of receivers is provided with a light absorbing layer for absorbing light other than collimated infrared light parallel to the inclination direction of the receiver.

In addition, the present application also provides a control method of the foldable display device, including:

emitting, by the transmitter, collimated infrared light;

transmitting, by a receiver, an electrical signal to the controller, in response to that the receiver receives the collimated infrared light; and determining, by a controller, a bending angle according to angle information of the receiver corresponding to the electrical signal, and controlling, by the controller, the display screen to switch to a display state for the bending angle.

Optionally, the bending angle is determined according to the following formula: $\alpha=\theta-\beta$; where $\alpha$ is the bending angle of the first half screen and the second half screen relative to each other; $\theta$ is an inclination angle of the receiver with respect to the second half screen; and $\beta$ is an inclination angle of the transmitter with respect to the first half screen.

Optionally, in the case where the display screen is an inwardly curved screen, an angle probe set is provided on a display surface of the display screen. The controller controls the display screen to sleep when no electrical signal is received, and controls the display screen into full-screen display when receiving at least one electrical signal.

Optionally, in the case where the display screen is an outwardly curved screen, an angle probe set is provided on a back surface of the display screen. The controller controls the display screen to sleep when no electrical signal is received, and the controller controls the display screen into half-screen display when receiving at least one electrical signal.

Optionally in the case where the display screen is an inwardly and outwardly curved screen, the foldable display device includes two sets of angle detection modules. Where a first angle probe set is located on a display surface of display screen, and a second angle probe set is located on a back surface of display screen. The controller controls the display screen into full-screen display according to at least one electrical signal transmitted by the first angle probe set, controls the display screen into half-screen display according to at least one electrical signal transmitted by the second angle probe set, and controls the display screen to sleep when no electrical signal is received.

DETAILED DESCRIPTION OF THE EMBODIMENTS

Figure 1:
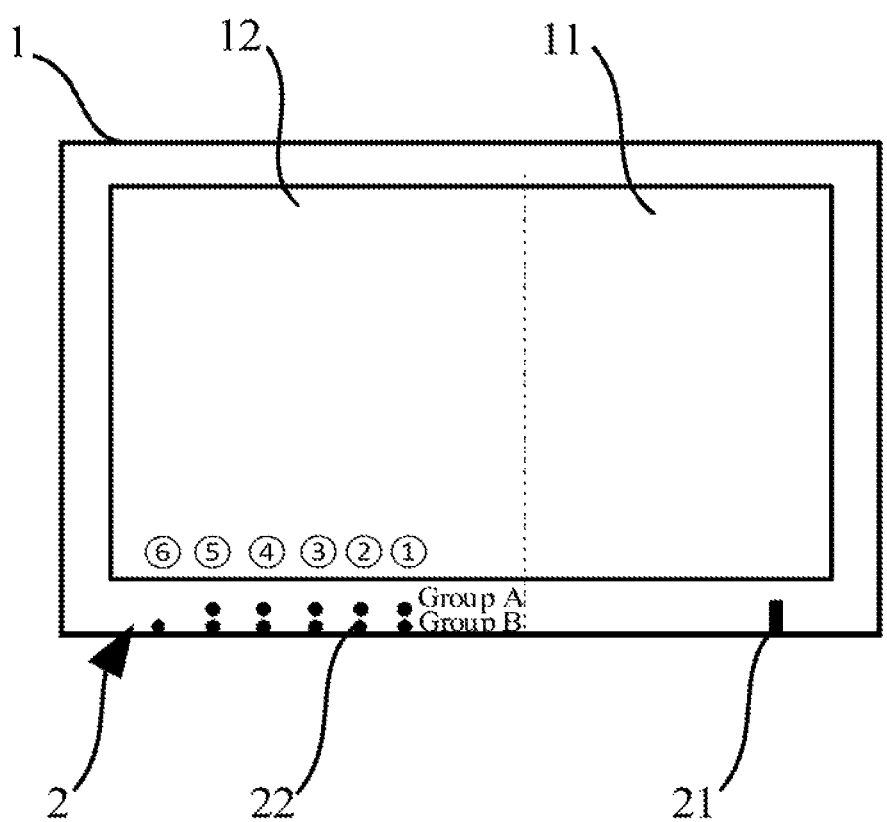
FIG. 1 is a schematic structural diagram of a foldable display device provided in the present application.

The technical solutions in the embodiments of the present application will be described clearly and completely below in conjunction with the accompanying drawings in the embodiments of the present application. Obviously, the described embodiments are only a part of the embodiments of the present application, and not all the embodiments. All other embodiments obtained by those of ordinary skill in the art without creative work, based on the embodiments in the present application, fall into the protection scope of the present application.

As shown in FIGS. 1, 2, 3 and 4, a foldable display device includes a display screen 1. The display screen 1 includes a first half screen 11, a second half screen 12. The display device further includes a controller and at least one angle probe set 2.

Each angle probe set 2 is located on the same surface of the display screen 1 and includes a transmitter 21 and a plurality of receivers 22. The transmitter 21 is inclined at a first angle with respect to the first half screen 11 and faces the second half screen 12, and is configured to emit collimated infrared light. Each receiver 22 is inclined at a second angle with respect to the second half screen 12, and different receivers have different second angles. Each receiver is in signal connection with the controller, and is configured to transmit an electrical signal to the controller when receiving the collimated infrared light.

The controller is in signal connection with the display screen 1, and is configured to determine a bending angle according to angle information of the receiver 22 corresponding to the received electrical signal and control the display screen 1 to switch to a display state for the bending angle.

In the foldable display device described above, the first half screen 11 is fixed and the second half screen 12 can be bent. During the bending process of the second half screen 12, all the plurality of receivers 22 on the second half screen 12 can receive the collimated infrared light. When a receiver 22 receives the collimated infrared light, it indicates that the receiver 22 is located on a collimated optical path of the collimated infrared light. At that time, the receiver 22 transmits an electrical signal to the controller, and the controller can obtain angle information of the receiver 22, i.e. inclination angle information of the receiver 22 with respect to the second half-screen 12, according to the electrical signal. Then the controller determines a bending angle of the second half screen 12 where the receiver 22 is located, according to the inclination angle information, and the controller controls the display screen 1 to switch to a display state corresponding to the bending angle. Since each receiver 22 is inclined at a first angle with respect to the second half-screen 12, the electrical signal transmitted by each receiver 22 corresponds to the angle information of the receiver 22, and the controller can detect bending angles of the second half screen 12 according to multiple pieces of angle information, and can continuously adjust the display effect according to the bending angles, to realize display state changes at different bending angles, thus improving the user experience.

The display screen 1 may be an inwardly curved screen, an outwardly curved screen, or an inwardly and outwardly curved screen. A bent surface of the display screen 1 is set as a folding surface, and an angle probe set 2 is provided on the folding surface; that is, a transmitter 21 and a plurality of receivers 22 are respectively located on the folding surface. The transmitter 21 and the plurality of receivers 22 may be located in a display area or in a non-display area.

Figure 2:
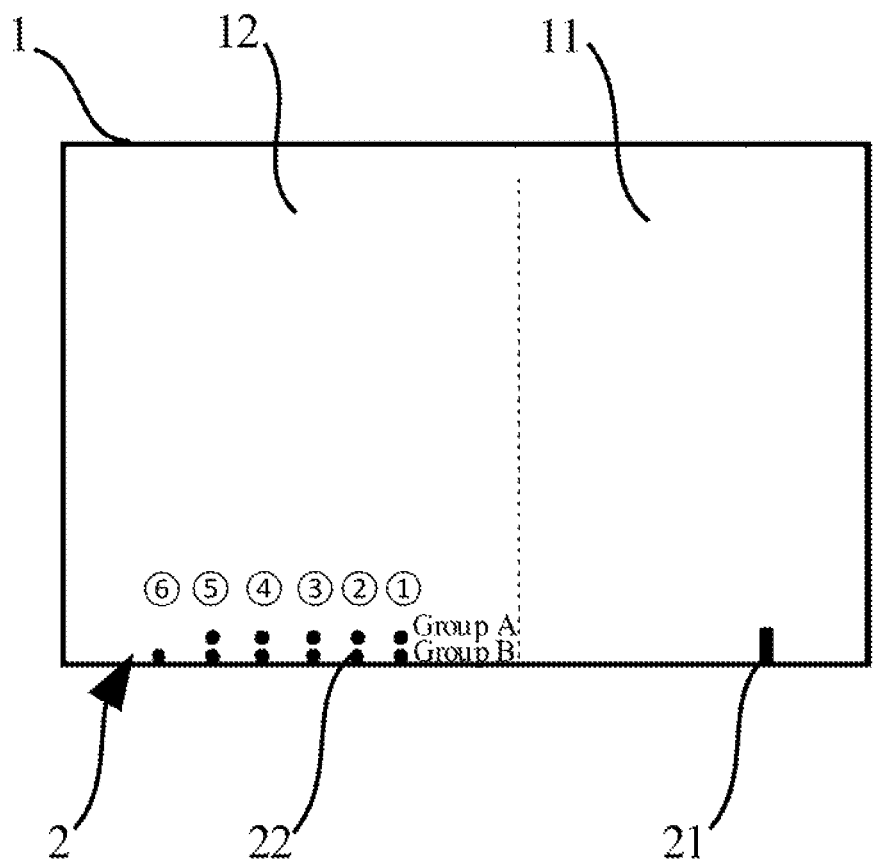
FIG. 2 is another schematic structural diagram of a foldable display device provided in the present application.
Figure 3:
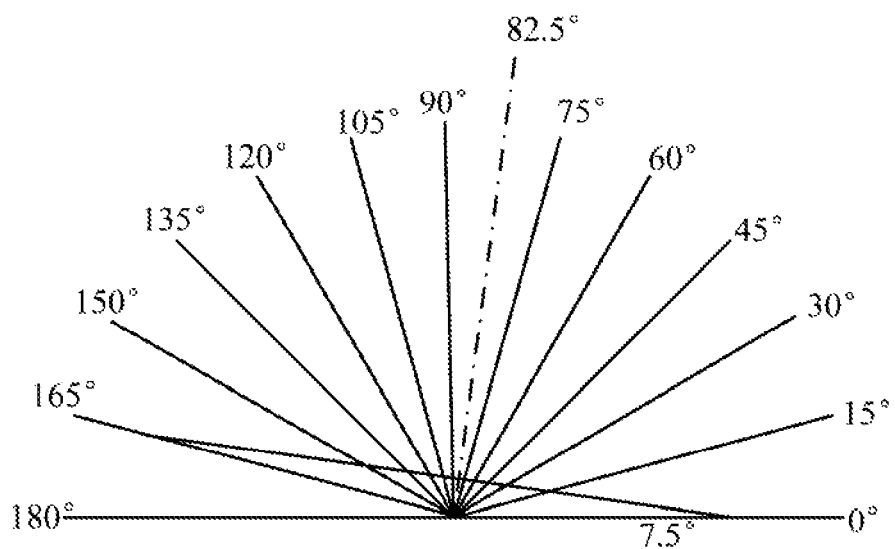
FIG. 3 is a schematic diagram illustrating receiving states of receivers in different bending states of a display screen in a foldable display device provided in the present application.

To facilitate the arrangement of the plurality of receivers 22, as shown in FIGS. 1 and 2, in an optional implementation, the plurality of receivers 22 are distributed in an array of two rows, and inclination angles of two receivers 22 in each column with respect to the second half screen 12 are supplementary angles.

In the foldable display device described above, the two-row array distribution allows the arrangement of more receivers 22. Supplement of the inclination angles of the two receivers 22 in each column with respect to the second half screen 12 can, on the one hand, achieve fast and convenient installation of the two receivers 22 in the same column direction, and on the other hand, also ensure that the controller can detect symmetrically distributed angle information.

In addition, in the actual design, the specific arrangement of the plurality of receivers 22 may also be determined according to actual conditions of the foldable display device. For example, considering factors such as the size, and the measurement accuracy of the bending angle, the plurality of receivers 22 may be arranged in one row, or may also be arranged in 3 rows.

Specifically, the difference between inclination angles of two adjacent receivers 22 in each row is not more than 30°.

In the foldable display device described above, to ensure the accuracy of angle detection, the difference between detected two adjacent bending angles is not more than 30°, and this accuracy is guaranteed by the difference of inclination angles between two adjacent receivers 22 in each row being not more than 30°. That is, the accuracy of angle detection can be ensured by setting the inclination angles between two adjacent receivers 22 in each row, where the difference of inclination angles between two adjacent receivers 22 in each row may be 30°, 25°, 20°, 15° or 10°, and the corresponding accuracy of angle detection is 30°, 25°, 20°, 15° or 10°. In consideration of the size of the foldable display device and the size of the receiver 22, to maximize the accuracy of angle detection, a maximum number of receivers 22 that can be placed may be set for the folding surface, and the specific number of receivers 22 and the accuracy of angle detection are determined based on actual conditions of the foldable display device.

To ensure the reliability of angle detection, in an optional implementation, an inclination angle of each receiver 22 with respect to the second half screen 12 is greater than an inclination angle of the transmitter 21 with respect to the first half screen 11.

In the foldable display device described above, since the receiver 22 can receive the collimated infrared light only when the receiver 22 is located on the collimated optical path of the collimated infrared light, the setting of the inclination angle of the receiver 22 with respect to the second half screen 12 to be greater than the inclination angle of the transmitter 21 with respect to the first half screen 11 ensures that the receiver 22 can receive a collimated infrared ray after the second half screen 12 rotates a certain angle, i.e. ensuring that when the two half screens are folded together, the foldable display device cannot detect angle information, and only during a bending process can the receiver 22 receive the collimated infrared ray, and then the controller controls a display state change of the display screen 1.

To ensure the reliability of angle detection, in an optional implementation, each receiver 22 is provided with a light absorbing layer for absorbing light other than collimated infrared light parallel to the inclination direction thereof.

In the foldable display device described above, by providing the light absorbing layer on the receiver 22 to absorb light other than collimated infrared light parallel to its inclination direction, light from other angles than a receiving angle of the receiver 22 incident on the receiver 22 is filtered, and the collimated infrared light parallel to its inclination direction is received. That is, only collimated infrared light parallel to its inclination direction can trigger the receiver 22 to generate an electrical signal, thereby preventing other light from mistakenly triggering an operation of the receiver 22, thus ensuring the reliability of angle detection.

Figure 5:
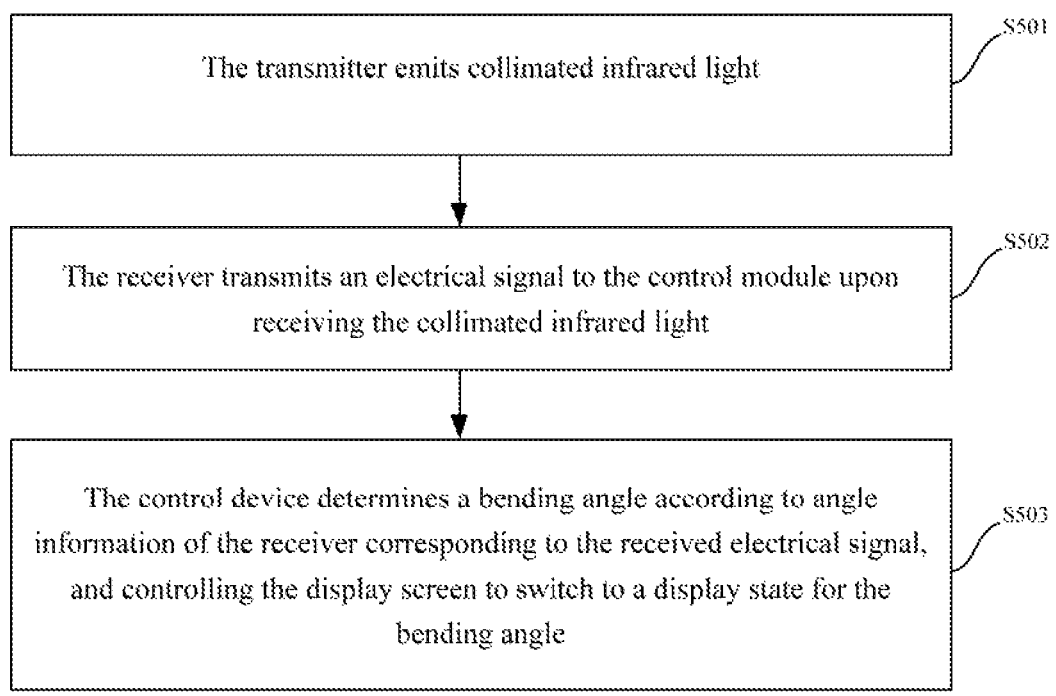
FIG. 5 is a control method of a foldable display device provided in the present application.

In addition, as shown in FIG. 5, the present application also provides a control method of a foldable display device, including:

Step S501: the transmitter 21 emits collimated infrared light;

Step S502: the receiver 22 transmits an electrical signal to the controller upon receiving the collimated infrared light; and Step S503: the controller determines a bending angle according to angle information of the receiver 22 corresponding to the received electrical signal, and controlling the display screen 1 to switch to a display state for the bending angle.

In the control method of the foldable display device described above, the first half screen 11 is set fixed, and the second half screen 12 can be bent. During the bending process of the second half screen 12, an electrical signal transmitted by each receiver 22 corresponds to angle information of the receiver 22, and the controller can detect bending angles of the second half screen 12 according to multiple pieces of angle information. Specifically, first in step S501, the transmitter 21 transmits collimate infrared light to the direction of the second half-screen 12; then in step S502, the receiver 22 receives the collimated infrared light through, which indicates that the receiver 22 is located on a collimated optical path of the collimated infrared light, and at that time, the receiver 22 transmits an electrical signal to the controller; and finally in step S503, the controller can obtain angle information of the receiver 22 transmitting the electrical signal according to the electrical signal, and determine a bending angle of the second half screen 12 where the receiver 22 is located, and the controller controls the display screen 1 to switch to a display state corresponding to the bending angle. Thus, by using the afore-mentioned control method, the display effect can be continuously adjusted conveniently and quickly according to the detected bending angles, to realize display state changes at different bending angles, thus improving the user experience.

The inclination angle of the transmitter 21 with respect to the first half screen 11 may be 5°-10°. For ease of description, the inclination angle of the transmitter 21 with respect to the first half screen 11 is set to 7.5°, and the number of devices 22 is set to 11.

In an optional implementation, the bending angle is determined according to the following formula: $\alpha = \theta - \beta$ where $\alpha$ is the bending angle of the second half screen 12 relative to the first half screen 11;

$\theta$ is the inclination angle of the receiver 22 with respect to the second half screen 12; and $\beta$ is the inclination angle of the transmitter 21 with respect to the first half screen 11.

As shown in FIGS. 1, 2, 3 and 4, in the control method of the foldable display device described above, 11 receivers 22 are distributed in an array of two rows, namely a group A of receivers 22 in an upper row and a group B of receivers 22 in a lower row, and the inclination directions of the two groups of receivers 22 with respect to the second half screen 12 are symmetrical about a direction with bending angle of 82.5°. Where the inclination angles of the group A of receivers 22 with respect to the second half screen 12 are acute angles smaller than 82.5°, and the inclination angles of the group B of receivers 22 are obtuse angles greater than 82.5°. The inclination angle of a receiver 221A with respect to the second half screen 12 is 82.5°; the inclination angle of a receiver 221B with respect to the second half screen 12 is 97.5°; the inclination angle of a receiver 222A with respect to the second half screen 12 is 67.5°; the inclination angle of a receiver 222B with respect to the second half screen 12 is 112.5°; the inclination angle of a receiver 223A with respect to the second half screen 12 is 52.5°; the inclination angle of a receiver 223B with respect to the second half screen 12 is 127.5°; the inclination angle of a receiver 224A with respect to the second half screen 12 is 37.5°; the inclination angle of a receiver 224B with respect to the second half screen 12 is 142.5°; the inclination angle of a receiver 225A with respect to the second half screen 12 is 22.5°; the inclination angle of a receiver 225B with respect to the second half screen 12 is 157.5°; and the inclination angle of a receiver 226B with respect to the second half screen 12 is 172.5°.

Figure 4:
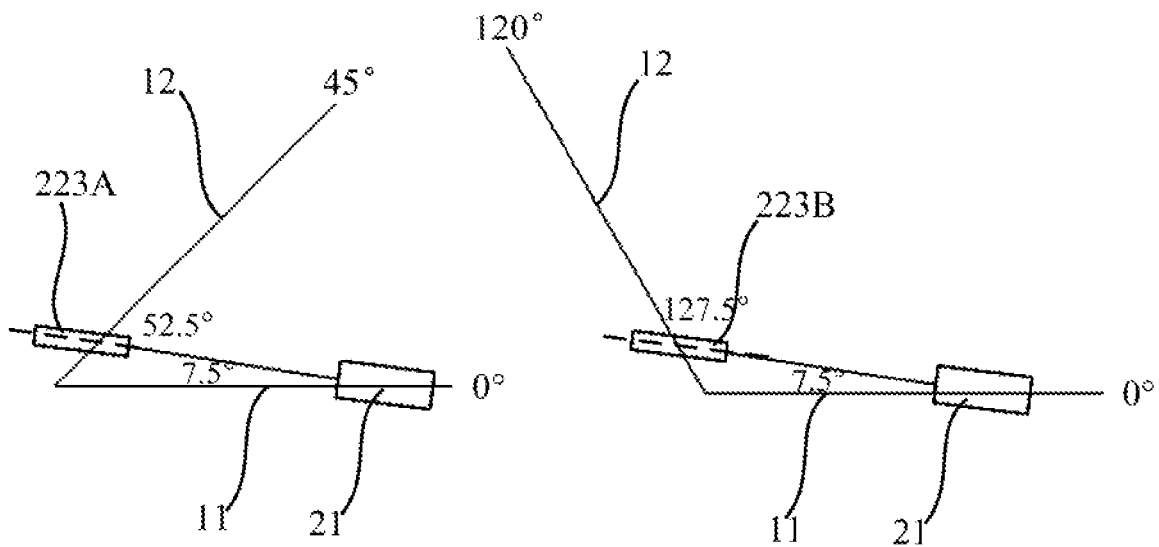
FIG. 4 is a schematic diagram of directions of receivers when a display screen in a foldable display device provided in the present application is bent at 45° and 120°.

As shown in FIG. 4, using the receiver 223A and the receiver 223B as an example, the bending angle of the second half screen 12 is calculated according to the inclination angles of the receivers with respect to the second half screen 12 using the above formula. As shown in FIG. 4, the inclination angle of the receiver 223A with respect to the second half screen 12 is 52.5°, and the inclination angle of the transmitter 21 with respect to the first half screen 11 is 7.5°, and according to the formula $\alpha = \theta - \beta$, the bending angle $\alpha$ is 45°; similarly, the inclination angle of the receiver 223B with respect to the second half screen 12 is 127.5°, and according to the above formula, the bending angle $\alpha$ is 120°.

Specifically, the 11 receivers 22 receive collimated infrared light successively, and when a receiver 22 receives the collimated infrared light, it indicates that the receiver 22 is located on a collimated optical path of collimated infrared light, and at that time, the receiver 22 transmits an electrical signal to the controller, and the controller can calculate a bending angle of the second half-screen 12 according to the above formula. The bending angle of the second half screen 12 corresponding to the receiver 221A is 75°; the bending angle of the second half screen 12 corresponding to the receiver 221B is 90°; the bending angle of the second half screen 12 corresponding to the receiver 222A is 60°; the bending angle of the second half screen 12 corresponding to the receiver 222B is 105°; the bending angle of the second half screen 12 corresponding to the receiver 223A is 45°; the bending angle of the second half screen 12 corresponding to the receiver 223B is 120°; the bending angle of the second half screen 12 corresponding to the receiver 224A is 30°; the bending angle of the second half screen 12 corresponding to the receiver 224B is 135°; the bending angle of the second half screen 12 corresponding the receiver 225A is 15°; the bending angle of the second half screen 12 corresponding to the receiver 225B is 150°; and the bending angle of the second half screen 12 corresponding to the receiver 226B is 165°.

The first half screen 11 set to be fixed, and the first half screen 11 is in a direction of 0°; the second half screen 12 is bent and gradually unfolded from 0° to 180°. The receivers 22 receive the collimated infrared light in the order from the receiver 225A, via the receiver 224A, the receiver 223A, the receiver 222A, the receiver 221A, the receiver 221B, the receiver 222B, the receiver 223B, the receiver 224B, and the receiver 225B, to the receiver 226B. Of course, the reverse of the above order applies to a scenario where the screen is bent from 180° to 0°.

To wake up the screen without operation on the physical button when the display screen 1 is unfolded, in an optional implementation, as shown in FIG. 1, in the case where the display screen 1 is an inwardly curved screen, an angle probe set 2 is provided on a display surface of the display screen 1: the controller controls the display screen 1 to sleep when no electrical signal is received, and controls the display screen into full-screen display when receiving at least one electrical signal.

In the control method of the foldable display device described above, in the case where the display screen 1 is an inwardly curved screen, the folding surface is the display surface, and an angle probe set 2 is arranged on the display surface of the display screen 1. Using the second half screen 12 bent and gradually unfolded from 0° to 180° as an example for description, when the two half screens are folded together at 0°, the foldable display device cannot detect angle information. The controller controls the display screen 1 to sleep when no electrical signal is received. Only during a bending process can the receiver 22 receive collimated infrared light, then the controller controls the display screen 1 to change its display state. The second half screen 12 is bent and gradually unfolded from 0° to 180°, and the receivers 22 receive the collimated infrared light in an order from the receiver 225A, via the receiver 224A, the receiver 223A, the receiver 222A, the receiver 221A, the receiver 221B, the receiver 222B, the receiver 223B, the receiver 224B, and the receiver 225B, to the receiver 226B. When the second half screen 12 is bent at 15°, the receiver 225A first receives the collimated infrared light, which triggers an electrical signal. The controller determines the bending angle at that time to be 15° according to the electrical signal, records the angle and controls the display screen 1 to be lit up and into full-screen display. In the subsequent bending process, the display screen 1 displays all the time, and the collimated infrared light triggers the receivers 22 successively, and the display state is continuously adjusted.

To wake up the screen without operation on physical buttons when the display screen 1 is unfolded, in an optional implementation, as shown in FIG. 2, in the case where the display screen 1 is an outwardly curved screen, an angle probe set 2 is provided on a back surface of the display screen 1, and the controller controls the display screen 1 to sleep when no electrical signal is received, and the controller controls the display screen 1 into half-screen display when receiving at least one electrical signal.

In the control method of the foldable display device described above, when the display screen 1 is an outwardly curved screen, the folding surface is the back surface of the display screen 1, and an angle probe set 2 is arranged on the back surface of the display screen 1. Using the second half screen 12 bent and gradually unfolded from 0° to 180° as an example for description, when the two half screens are folded together at 0°, the foldable display device cannot detect angle information, and the controller controls the display screen 1 to sleep when no electrical signal is received. Only during a bending process can the receiver 22 receive collimated infrared light, then the controller controls the display screen 1 to change its display state, the second half screen 12 is bent and gradually unfolded from 0° to 180°, and the receivers 22 receive the collimated infrared light in an order from the receiver 225A, via the receiver 224A, the receiver 223A, the receiver 222A, the receiver 221A, the receiver 221B, the receiver 222B, the receiver 223B, the receiver 224B, and the receiver 225B, to the receiver 226B. When the second half screen 12 is bent at 15°, the receiver 225A first receives the collimated infrared light, which triggers an electrical signal. The controller determines the bending angle at that time to be 15° according to the electrical signal, records the angle and controls the display screen 1 to be lit up and into half-screen display. In the subsequent bending process, the display screen 1 displays all the time, and the collimated infrared light triggers the receivers 22 successively, and the display state is continuously adjusted.

To wake up the screen without operation on the physical buttons when the display screen 1 is unfolded, in an optional implementation, in the case where the display screen 1 is an inwardly and outwardly curved screen, the foldable display device includes two sets of angle detection modules 2. A first angle probe set 2 is arranged on the display surface of display screen 1, and a second angle probe set 2 is arranged on the back surface of display screen 1.

The controller controls the display screen 1 into full-screen display according to at least one electrical signal transmitted by the first angle probe set 2.

The controller controls the display screen 1 into half-screen display according to at least one electrical signal transmitted by the second angle probe set 2.

The controller controls the display screen 1 to sleep when no electrical signal is received.

In the control method of the foldable display device described above, in the case where the display screen 1 is an inwardly and outwardly curved screen, the first angle probe set 2 is arranged on the display surface of the display screen 1, and the second angle probe set 2 is arranged on the back surface of the display screen 1. Using the second half screen 12 bent and gradually unfolded from 0° to 180° as an example for description. When the two half screens are folded together at 0°, the foldable display device cannot detect angle information, and the controller controls the display screen 1 to sleep when no electrical signal is received. Only during a bending process can the receiver 22 receive collimated infrared light. The controller controls the display screen 1 to change its display state, the second half screen 12 is bent and gradually unfolded from 0° to 180°, and the receivers 22 receive the collimated infrared light in an order from the receiver 225A, via the receiver 224A, the receiver 223A, the receiver 222A, the receiver 221A, the receiver 221B, the receiver 222B, the receiver 223B, the receiver 224B, and the receiver 225B, to the receiver 226B. In an inwardly curved situation, when the second half screen 12 is bent at 15°, the receiver 225A in the first angle probe set 2 first receives the collimated infrared light, which triggers an electrical signal, and the controller determines the bending angle at that time to be 15° according to the electrical signal, records the angle and controls the display screen 1 to be lit up and into full-screen display. In the subsequent bending process, the display screen 1 displays all the time, and the collimated infrared light triggers the receivers 22 successively, and the display state is continuously adjusted. In an outwardly curved situation, when the second half screen 12 is bent at 15°, the receiver 225A in the second angle probe set 2 first receives the collimated infrared light, which triggers an electrical signal, and the controller determines the bending angle at that time to be 15° according to the electrical signal, records the angle and controls the display screen 1 to be lit up and into half-screen display. In the subsequent bending process, the display screen 1 performs display all the time, and the collimated infrared light triggers the receivers 22 successively, and the display state is continuously adjusted.

Obviously, those skilled in the art can make various modifications and variations to the embodiments of the present application without departing from the spirit and scope of the present application. Thus, the present application is also intended to encompass these changes and modifications if such changes and modifications of the present application are within the scope of the claims of the present application and equivalents thereof.

I claim:

1. A foldable display device, comprising:
    a display screen, wherein the display screen comprises a first half screen and a second half screen;
    a controller; and
    at least one angle probe set;
    wherein
        each of the at least one angle probe set comprises a transmitter and a plurality of receivers; wherein the transmitter and the plurality of receives are located on a same surface of the display screen;
            wherein the transmitter is inclined at a first angle with respect to the first half screen and faces the second half screen, and is configured to emit collimated infrared light; and
            each of the plurality of receivers is inclined at a second angle with respect to the second half screen, wherein different receivers have different second angles; and wherein the each of the plurality of receivers is in signal connection with the controller, and is configured to transmit an electrical signal to the controller when receiving the collimated infrared light; and
        the controller is in signal connection with the display screen, and is configured to determine a bending angle according to angle information of a receiver corresponding to a received electrical signal and control the display screen to switch to a display state for the bending angle;
    wherein the plurality of receivers are distributed in an array of two rows, and second angles of two receivers in each column are supplementary.

2. The foldable display device according to claim 1, wherein a difference between second angles of two adjacent receivers in each row is not more than 30°.

3. The foldable display device according to claim 1, wherein the second angle is greater than the first angle.

4. The foldable display device according to claim 1, wherein each of the plurality of receivers has a light absorbing layer for absorbing light other than collimated infrared light parallel to an inclination direction of said receiver.

5. A control method of a foldable display device, wherein the foldable display device comprises:
    a display screen, wherein the display screen comprises a first half screen and a second half screen;
    a controller; and
    at least one angle probe set;
    wherein
        each of the at least one angle probe set comprises a transmitter and a plurality of receivers; wherein the transmitter and the plurality of receivers are located on a same surface of the display screen;
            wherein the transmitter is inclined at a first angle with respect to the first half screen and faces the second half screen, and is configured to emit collimated infrared light; and
            each of the plurality of receivers is inclined at a second angle with respect to the second half screen, wherein different receivers have different second angles; and wherein the each of the plurality of receivers is in signal connection with the controller, and is configured to transmit an electrical signal to the controller when receiving the collimated infrared light; and
        the controller is in signal connection with the display screen, and is configured to determine a bending angle according to angle information of a receiver corresponding to a received electrical signal and control the display screen to switch to a display state for the bending angle;
    wherein the plurality of receivers are distributed in an array of two rows, and second angles of two receivers in each column are supplementary;
    wherein the method comprises:
        emitting, by the transmitter, collimated infrared light;
        transmitting, by a receiver, an electrical signal to the controller, in response to that the receiver receives the collimated infrared light; and
        determining, by a controller, a bending angle according to angle information of the receiver corresponding to the electrical signal, and controlling, by the controller, the display screen to switch to a display state for the bending angle.

6. The control method according to claim 5, wherein the bending angle is determined according to a following formula:

$$\alpha=\theta-\beta$$

wherein $\alpha$ is the bending angle of the first half screen and the second half screen relative to each other;
$\theta$ is an inclination angle of the receiver with respect to the second half screen; and
$\beta$ is an inclination angle of the transmitter with respect to the first half screen.

7. The control method according to claim 6, wherein in a case where the display screen is an inwardly curved screen, an angle probe set is provided on a display surface of the display screen, and the controller controls the display screen to sleep when no electrical signal is received, and controls the display screen into full-screen display in response to receiving at least one electrical signal.

8. The control method according to claim 6, wherein in a case where the display screen is an outwardly curved screen, an angle probe set is provided on a back surface of the display screen, and the controller controls the display screen to sleep when no electrical signal is received, and controls the display screen into half-screen display when receiving at least one electrical signal.

9. The control method according to claim 6, wherein in a case where the display screen is an inwardly and outwardly curved screen, the foldable display device comprises two angle probe sets, wherein a first angle probe set is located on a display surface of display screen, and a second angle probe set is located on a back surface of display screen, wherein:
  the controller controls the display screen into full-screen display according to at least one electrical signal transmitted by the first angle probe set;
  the controller controls the display screen into half-screen display according to at least one electrical signal transmitted by the second angle probe set; and
the controller controls the display screen to sleep when no electrical signal is received.

10. The control method according to claim 5, wherein in a case where the display screen is an inwardly curved screen, an angle probe set is provided on a display surface of the display screen, and the controller controls the display screen to sleep when no electrical signal is received, and controls the display screen into full-screen display in response to receiving at least one electrical signal.

11. The control method according to claim 5, wherein in a case where the display screen is an outwardly curved screen, an angle probe set is provided on a back surface of the display screen, and the controller controls the display screen to sleep when no electrical signal is received, and controls the display screen into half-screen display when receiving at least one electrical signal.

12. The control method according to claim 5, wherein in a case where the display screen is an inwardly and outwardly curved screen, the foldable display device comprises two angle probe sets, wherein a first angle probe set is located on a display surface of display screen, and a second angle probe set is located on a back surface of display screen, wherein:
  the controller controls the display screen into full-screen display according to at least one electrical signal transmitted by the first angle probe set;
  the controller controls the display screen into half-screen display according to at least one electrical signal transmitted by the second angle probe set; and
  the controller controls the display screen to sleep when no electrical signal is received.

\* \* \* \* \*